United States Patent
Li

(10) Patent No.: US 8,374,995 B2
(45) Date of Patent: Feb. 12, 2013

(54) EFFICIENT DATA BACKFLOW PROCESSING FOR DATA WAREHOUSE

(75) Inventor: Xuesheng Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 12/951,464

(22) Filed: Nov. 22, 2010

(65) Prior Publication Data

US 2011/0125707 A1 May 26, 2011

(30) Foreign Application Priority Data

Nov. 24, 2009 (CN) .......................... 2009 1 0246001

(51) Int. Cl.
*G06F 7/00* (2006.01)

(52) U.S. Cl. ....................................................... 707/602
(58) Field of Classification Search ................... 707/602
See application file for complete search history.

(56) References Cited

U.S. PATENT DOCUMENTS

| | | | |
|---|---|---|---|
| 6,151,608 A * | 11/2000 | Abrams | 707/679 |
| 6,446,092 B1 * | 9/2002 | Sutter | 1/1 |
| 6,665,682 B1 | 12/2003 | DeKimpe et al. | |
| 6,925,477 B1 | 8/2005 | Champagne et al. | |
| 6,925,630 B1 | 8/2005 | Britton et al. | |
| 7,016,903 B1 | 3/2006 | Thusoo et al. | |
| 7,299,216 B1 | 11/2007 | Liang et al. | |
| 7,720,804 B2 | 5/2010 | Fazal et al. | |
| 2002/0116389 A1 | 8/2002 | Chen et al. | |
| 2002/0143862 A1 | 10/2002 | Peterson | |
| 2003/0005098 A1 | 1/2003 | Koelle et al. | |
| 2006/0069803 A1 * | 3/2006 | Clark et al. | 709/237 |
| 2006/0072626 A1 | 4/2006 | Hands et al. | |
| 2007/0079126 A1 * | 4/2007 | Hsu et al. | 713/176 |
| 2009/0187711 A1 | 7/2009 | Amarendran et al. | |

* cited by examiner

*Primary Examiner* — Jensen Hu
(74) *Attorney, Agent, or Firm* — Van Pelt, Yi & James LLP

(57) ABSTRACT

Processing backflow data includes obtaining backflow data from a data warehouse, determining, according to a backflow rule for the backflow data, a respective destination table in a production system for each data item in the backflow data, and sending the data item according to the determined respective destination table in the production system.

10 Claims, 5 Drawing Sheets

EFFICIENT DATA BACKFLOW PROCESSING FOR DATA WAREHOUSE

CROSS REFERENCE TO OTHER APPLICATIONS

This application claims priority to People's Republic of China Patent Application No. 200910246001.3 entitled METHOD FOR BACKFLOW OF DATA AND DEVICE THEREOF filed Nov. 24, 2009 which is incorporated herein by reference for all purposes.

FIELD OF THE INVENTION

The present invention relates to the field of data warehousing technology and, in particular, to a data backflow technique.

BACKGROUND OF THE INVENTION

A data warehouse is a subject-oriented, integrated, non-volatile, and time-variant data set, designed to facilitate decision-making and data analysis for companies and organizations.

Normal operations of production systems require support by data warehouses. As used herein, backflow of data refers to loading the data from a computing result table of a data warehouse into a corresponding table of a production system database. As production systems become more complex, databases of the production systems are becoming increasingly overloaded. To alleviate the burden on databases of production systems, in many existing databases of production systems, large tables that are originally placed in a database are divided according to certain rules into multiple small tables in multiple independent databases in multiple inexpensive hosting systems. This technique can lower the hardware requirement and load on the databases of the production systems. However, due to the one-to-multiple change in data storage mode of the databases of the production systems, the backflow of data from a data warehouse to a production system database has to be changed correspondingly. Originally, the backflow of data propagates from a table of the data warehousing system to a table of the production database. As the large table in the production system database is divided into multiple small tables, the backflow of data now propagates from a table of the data warehouse to multiple sub-tables of the production system.

For example, if the table of the data warehouse corresponds to a large number of sub-tables of the production system database (e.g., when the large table is divided into thousands of sub-tables), an existing system implements data backflow by creating a corresponding sub-table in the data warehouse for each of the sub-tables of the production system database and updating the sub-tables of the production system database with corresponding the sub-tables of the data warehouse. This technique results in significant increase of the number of tables in the data warehouse, which further leads to greatly increased number of tables to be maintained and the difficulty of maintenance. Moreover, the process of distributing data of a single table to multiple sub-tables in a data warehouse is complicated, causing increased computing and backflow time and resulting in a bottleneck of backflow. In particular, if the prolonged backflow time occurs at a peak load hour of the production system database, the production system may be degraded in reliability.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
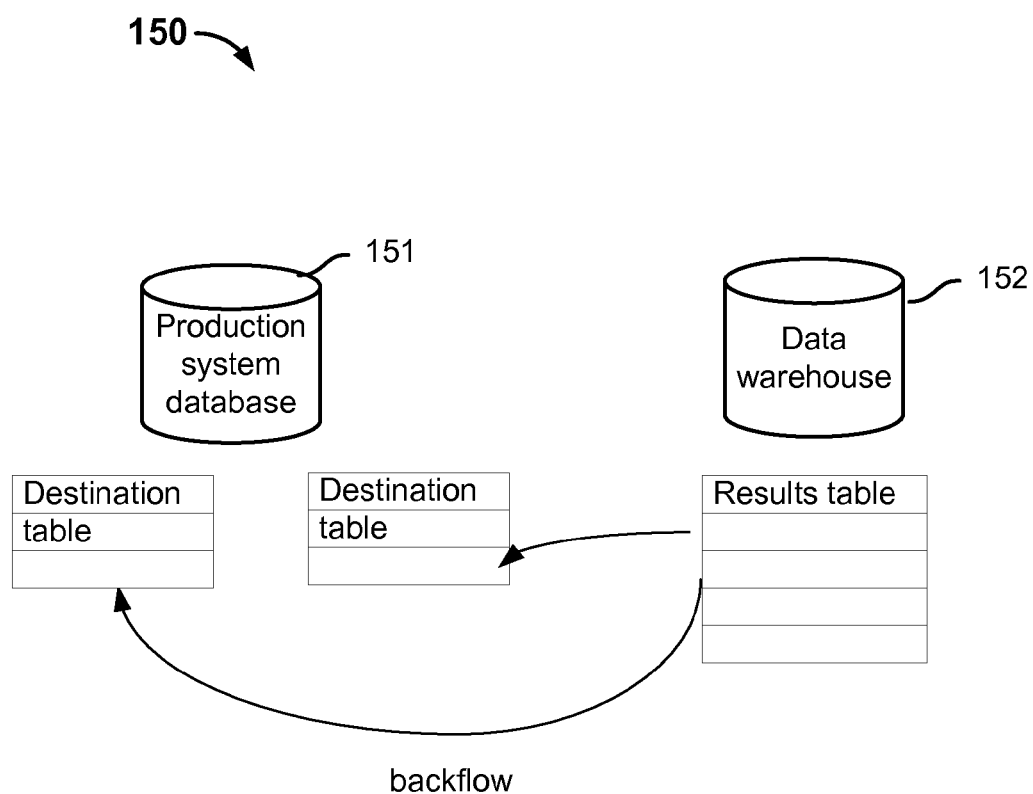
FIG. 1A is a system diagram illustrating an embodiment of an enterprise data system.

FIG. 1A is a system diagram illustrating an embodiment of an enterprise data system. System 150 includes a production system 152 and a data warehouse 154. The production system is the primary source for generating data. In some embodiments, the production system is implemented as a database or other storage for an e-commerce platform's front end system. The data warehouse is a database used to store data produced by the production system and generate reports on demand. As will be described in greater detail below, backflow data is obtained from the data warehouse and sent to multiple destination tables on the production system database.

Figure 1B:
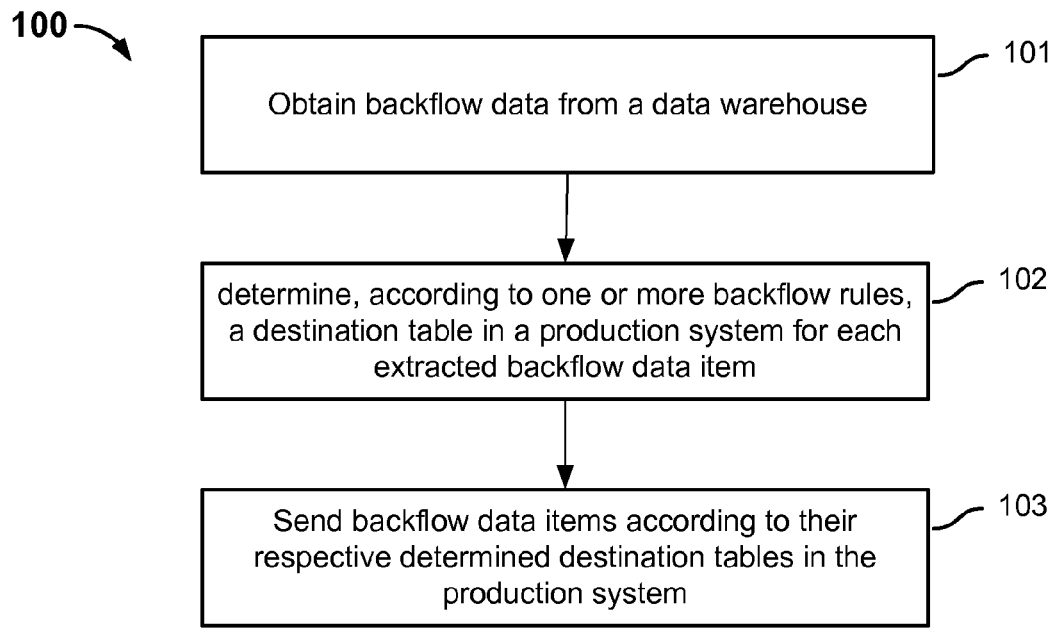
FIG. 1B is a flow chart illustrating an embodiment of a backflow process.

FIG. 1B is a flow chart illustrating an embodiment of a backflow process. The process may be performed on a system such as 150.

The process initiates at 101, where backflow data is obtained from a data warehouse. In some embodiments, the data for backflow is extracted from the data warehouse into a memory. In some embodiments, the data is concurrently extracted using a number of threads (e.g. 10 or more threads) to improve data extraction rate. The data for backflow may be extracted from the data warehouse into the memory all at one time. Alternatively, the backflow data may be extracted in batches, that is, the next batch of data for backflow is processed when the current batch of data for backflow is done, thereby improving processing efficiency.

At 102, a destination table in a production system is determined for each extracted backflow data item according to one or more backflow rules.

The backflow rules determine to which table in the production system the backflow data item in the data warehouse is destined. In some embodiments, the backflow rule is determined according to the number of destination tables in the production system and an attribute of the data for backflow. For example, it may be determined using a remainder resulting from dividing a value of a numeric field of the backflow data by the data in a destination table in the production system, using a value of some bits in a character string typed field of the data for backflow, or using a result from a particular function transformation of a value of one or more columns of a data row.

Each data item for backflow in the data warehouse has a destination table in the production system, i.e., a specific table in a database of the production system to which the data item for backflow is sent. A data item for backflow may have one destination table or may have multiple destination tables.

Using the backflow rules, a destination table in the production system is determined for each data item for backflow. This also means that all backflow data items are labeled.

At 103, backflow data items are sent according to their respective determined destination tables in the production system.

As discussed above, all the data for backflow are labeled in step 102. Therefore, at this time, the data items for backflow are sent according to their respective labels, from the memory in which the data items are temporarily stored into their destination tables in the production system. In practice, the data for backflow may be extracted into the memory in batches, and when the destination tables in the production system for all data items for backflow in a batch are determined, data items for backflow of this batch are sent from the memory into the respective destination tables. This technique can improve the efficiency of backflow of data.

Figure 2:
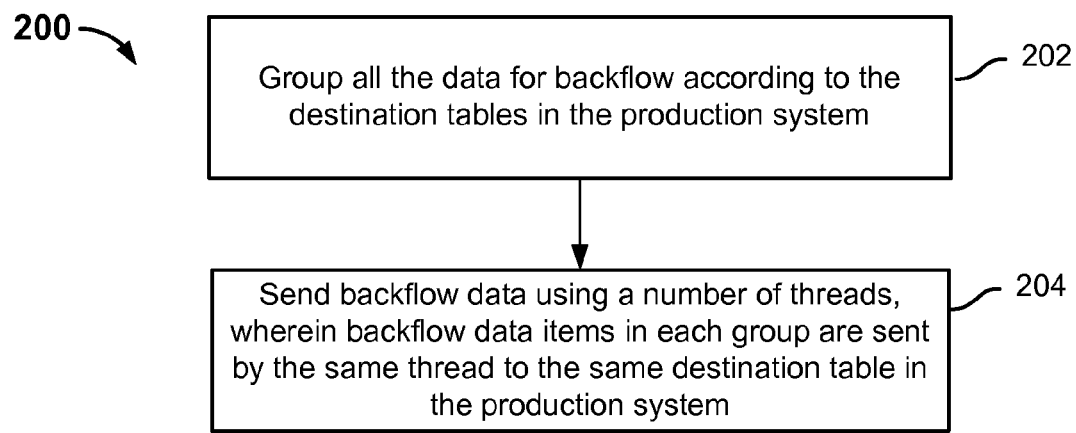
FIG. 2 is a flowchart illustrating an embodiment of a process for multi-threaded data backflow transmission.

Optionally, the data for backflow may also be sent concurrently using a number of threads to improve data sending efficiency. FIG. 2 is a flowchart illustrating an embodiment of a process for multi-threaded data backflow transmission.

At 202, all the data for backflow are grouped according to the destination tables in the production system. For example, suppose there are 100 data items for backflow, and it is determined in step 102 of process 100 that the data items have 15 destination tables in the production system, numbered 001-015. Accordingly, data items for backflow having a destination table 001 are grouped as a group 001, data items for backflow having a destination table 002 are grouped as a group 002, and so forth until data items having a destination table 015 are grouped as a group 015.

At 204, the data for backflow are sent using a number of threads, wherein backflow data items in each group are sent by the same thread to the same destination table in the production system. In the previously example, the 100 data items for backflow may be sent concurrently using 5 threads in 3 batches, with each batch including 5 groups of data, e.g., the data for backflow of groups 001 to 005 may be sent as the first batch. Particularly, a thread (labeled thread 1) may be used to send the data for backflow of the group 001, which has the same destination table 001 in the production system. Similarly, another thread (labeled thread 5) may be used to send the data for backflow of the group 005, which has the same destination table 005 in the production system.

In practice, data streams of respective groups may be different, and the data of some thread may be sent faster than the data of some other thread. The distribution of groups and threads may be adjusted depending on the actual situation to achieve the shortest amount of time required for sending the data. For example, a group having the highest amount of data and a group having the lowest amount of data may be sent in the same thread, thereby balancing the amount of data to be sent by the threads as a whole and reducing send time.

In existing databases of production systems, data of a logic table are distributed to multiple physical tables. The distribution presents a challenge to backflow of data in a data warehouse. The existing method is to create multiple physical tables in the data warehouse corresponding to those in the production system, that is, to create a corresponding table in the data warehouse for each sub-table in the production system. First, data in the large table of the data warehouse are inserted into multiple sub-tables respectively; then, data in the sub-tables of the data warehouse flows back to the corresponding sub-tables in the production system. Considerable efforts are spent on table-dividing and configuration in initialization, and the number of configuration rules are huge. The overall backflow processing time and complexity are increased, and the efficiency and simplicity for updating the production system with the data in the data warehouse are degraded.

The embodiment of the application improves the backflow processing of a large table of the data warehouse to multiple small tables in the production system. Specifically, the data warehouse only needs to prepare the data for backflow, thereby avoiding the redundant procedure in the prior art of dividing the large table of the data warehouse into multiple small tables corresponding to the production system, which may greatly improve the configuration efficiency of the backflow and reduce the time cost caused by the backflow.

Figure 3:
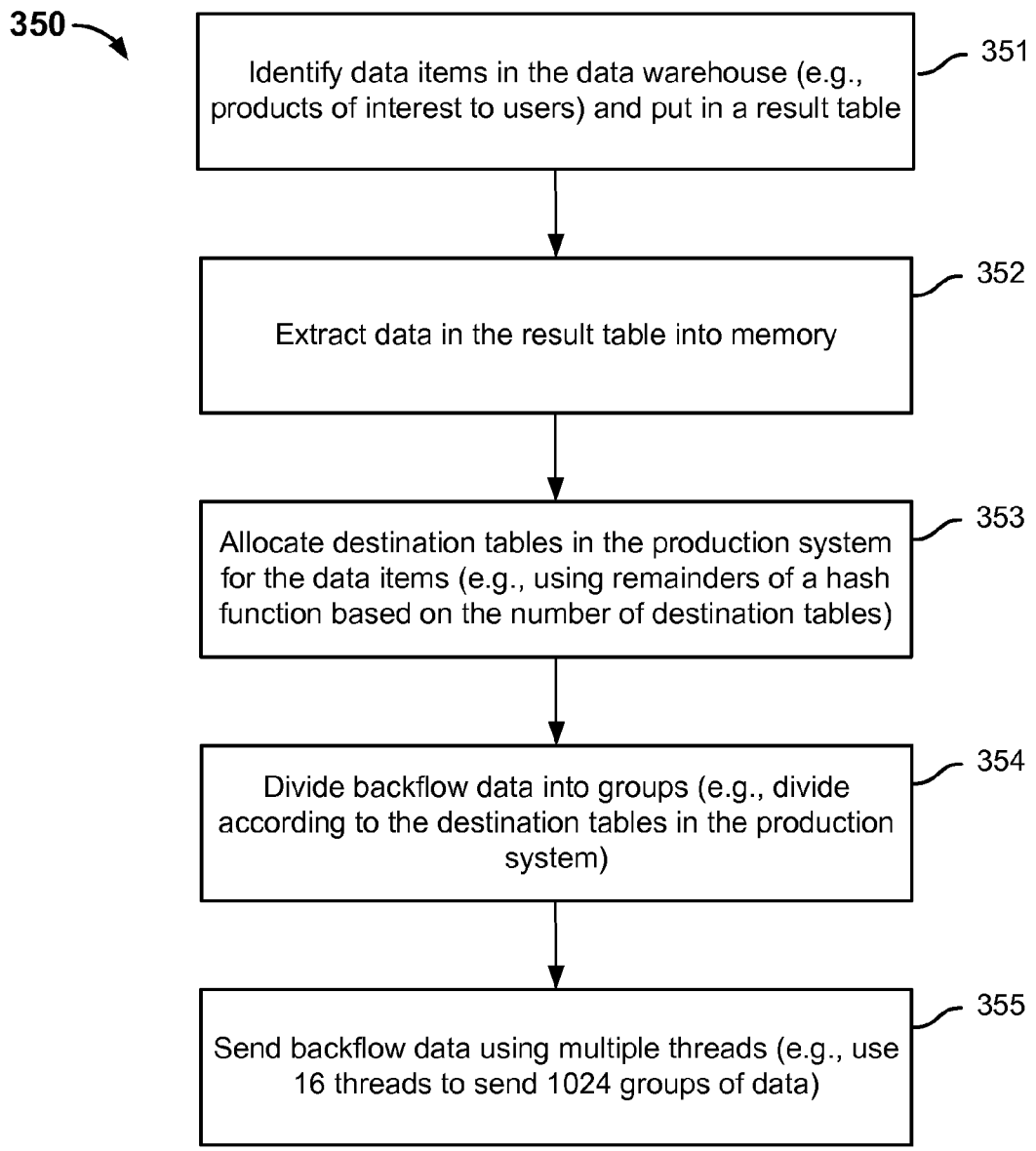
FIG. 3 is a flowchart illustrating an embodiment of a process for backflow data processing.

FIG. 3 is a flowchart illustrating an embodiment of a process for backflow data processing. Process 350 may be implemented on a system such as 100. In this example, process 350 is executed in the context of obtaining products of interest by a user of an e-commerce website.

At 351, products of interest to the user are identified. A result table named recommended_items_table is generated in a data warehouse.

In this example, the result table has the format as shown in Table 1, which includes a user identifier (ID) field and one or more product ID fields for the products that the user is interested in.

TABLE 1

| User_id | user ID |
| Item_id | product ID |

At 352, data in the result table for backflow are extracted from the data warehouse into memory.

In some embodiments, the data is extracted from the result table of the data warehouse concurrently using multiple threads. The number of threads may vary depending on implementation. 10 threads are used in this example.

If the data is extracted from the data warehouse using a number of threads, the range of data to be extracted for each thread is set in advance, preventing the same data from being extracted more than once, so that the threads can operate cooperatively to achieve high efficiency in the extraction of data for backflow.

At 353, destination tables for the data items in the result table are allocated. In this example, the allocation is based on a hashing function that divides the numerical user IDs of the items by a value (such as the number of destination tables) and computes the remainders of the division. Different remainder values correspond to different destination tables. Other allocation techniques may be used in other embodiments. For example, in embodiments where the IDs are character strings, processing of the character strings may be performed using some function to map the data for backflow to destination tables. For example, for 24 destination tables, the data for backflow may be mapped to the 24 destination tables according to the initial characters of the character strings.

In an embodiment of the application, we have 1024 destination tables in the production system, labeled recommend_item_table_0001-recommend_item_table_1024. Each destination table is structured the same way as the result table in the data warehouse.

The backflow rule used in the embodiment of the application is based on the remainders resulting from dividing the numeric user IDs by 1024. In fact, when backflow of data is done, data in each destination table is a subset of data in the result table in the data warehouse, and the destination tables are allocated based on the remainders resulting from the division of the numeric user IDs by 1024 and different remainders correspond to different destination tables.

At 354, all the data for backflow is divided into groups. In this example, the data is divided into 1024 groups according to the destination tables in the production system.

At 355, the data for backflow are sent using multiple threads, where data items for backflow in each group in each thread are sent to the same destination table in the production system. In this example, the data for backflow are divided into 1024 groups, each of which has the same destination table. In order to improve the backflow speed, the data for backflow are sent concurrently using 16 threads, each of which sends 64 groups of data for backflow.

The specific number of threads and the number of groups of data for backflow sent in respective threads may be determined based on an actual situation of the devices and therefore are not limited in this application.

Previously, generating 1024 tables in the data warehouse according to the requirement of the production system in backflow of data may significantly increase the amount of computing required for backflow processing and, consequently, result in a bottleneck of backflow processing. If the backflow time is prolonged to a peak load hour of the production system database, the production system may be degraded in reliability. Using the technique discussed above, only a single result table needs to be generated in the data warehouse, thus avoiding the need for building many sub-tables in the data warehouse and greatly reducing backflow time and improving backflow efficiency.

Figure 4:
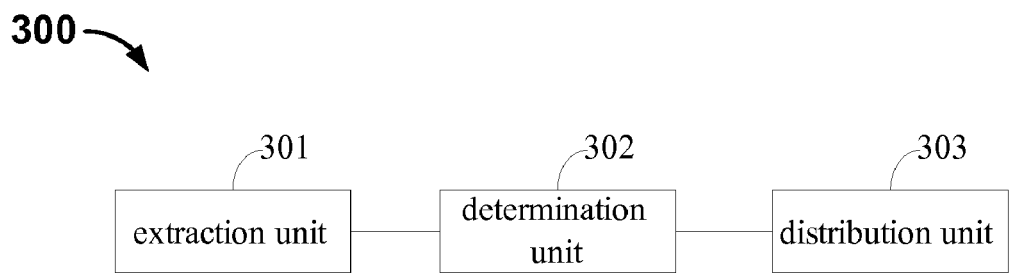
FIG. 4 is a block diagram illustrating an embodiment of a device for backflow data processing.

FIG. 4 is a block diagram illustrating an embodiment of a device for backflow data processing. System includes an extraction unit 301, adapted to extract data for backflow from a data warehouse into a memory; a determination unit 302, adapted to determine a destination table in a production system for each extracted data item for backflow according to a backflow rule for the data for backflow, with the backflow rule may be determined according to the number of destination tables in the production system and an attribute of the data for backflow. The attribute of the data for backflow includes: a value of a digit in the data for backflow, or a value of one or more digits in a character string type field of the data for backflow, for example, the backflow rule in an embodiment of the application is determined according to the number of destination tables and a value of a numeric bit of the data for backflow; and a distribution unit 303, adapted to send the data for backflow according to the determined destination table in the production system for each data item for backflow.

In practice, the extraction unit 301 is further adapted to extract the data for backflow from the data warehouse into the memory concurrently using a plurality of threads, in order to improve the efficiency of backflow of data provided by an embodiment of the invention.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

Figure 5:
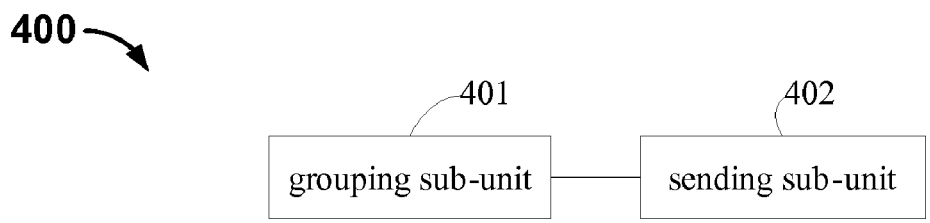
FIG. 5 is a block diagram illustrating an embodiment of a distribution unit.

FIG. 5 is a block diagram illustrating an embodiment of a distribution unit. The distribution unit may be used to implement 303 of system 300. The distribution unit includes a grouping sub-unit 401, adapted to group all the data for backflow according to the destination tables in the production system; and a sending sub-unit 402, adapted to send the data for backflow according to the grouping using a plurality of threads, wherein data items for backflow in each group in each thread are sent to the same destination table in the production system.

For example, suppose we have 100 data items for backflow, and it is determined by determination unit 302 that the data items have 15 destination tables, numbered 001-015, in the production system. Therefore, the grouping sub-unit 401 groups data items for backflow having a destination table 001 into a group 001, groups data items for backflow having a destination table 002 into a group 002, and so forth until groups data items having a destination table 015 into a group 015. Then, the sending sub-unit sends the data for backflow concurrently using 5 threads in 3 batches, with each batch including 5 groups of data, e.g., the data for backflow of groups 001 to 005 may be sent as the first batch. Particularly, a thread 1 may be used to send the data for backflow of the group 001, which has the same destination table 001 in the production system. Similarly, a thread 5 may be used to send the data for backflow of the group 005, which has the same destination table 005 in the production system.

As a matter of course, data streams of respective groups may be different, therefore, data of some thread may be sent faster than data of some other thread. In practice, in which thread a group is sent may be adjusted depending on the actual situation, for example, a group having the most of data and a group having the minimum amount of data may be sent in the same thread, thereby balancing data amounts of respective threads as a whole, and finally achieving sending all data to be sent in the shortest period of time.

The device provided by the embodiment of the invention avoids the process of building many sub-tables in the data warehouse and maintains the original data structure of the data warehouse, thereby avoiding the problems caused by change in the structure of data warehouse such as prolonged data computing time for tables and backflow time and degraded reliability of the production system, and greatly reducing backflow time and improving backflow efficiency, solving the problem of backflow of data of a large table of the data warehouse to multiple small tables in the production system.

For convenience, the device above is described in units based on their functions. As a matter of course, the functions of the units may be implemented in single or multiple software and/or hardware while implementing the application.

As can be seen from the foregoing description of the embodiments, those skilled in the art can clearly understand that the application may be implemented with software in combination of some necessary general-purpose hardware platform. Based upon such understanding, the essence or the inventive part of the technical solution of the application may be embodied in the form of a software product, which may be stored in a storage medium, e.g., an ROM/RAM, a magnetic disk, an optical disk, etc., and may include several instructions for causing a computer device (which may be a personal computer, a server, a network device, etc.) to perform a method according to the embodiments of the application or according to some parts of the embodiments.

The embodiments in the specification are described progressively, their common or similar parts can be taken for mutual reference and each of the embodiments has placed an emphasis on its difference from the other embodiments. Especially, the system embodiments described briefly, as they are substantially similar to the method embodiments, for details thereof, reference can be made to those parts of the description of the method embodiments.

The application may be applied in numerous general-purpose or dedicated computer system environments or configurations, e.g., personal computers, server computers, handhelds or portable devices, flat panel devices, multi-processor systems, microprocessor based systems, set-top boxes, programmable consumer electronic devices, network PCs, miniaturized computers, large-scale computers, distributed computing environments including any of the foregoing system or devices, etc.

The application may be described in the general context of a computer executable instruction, e.g., a program module, which generally includes a routine, program, object, component, data structure, etc., for the execution of a specific task or to implement a specific abstract data type. Alternatively, the application may be implemented in a distributed computing environment in which a task is executed by a remote processing device connected over a communication network and in which the program module may be located in a local or remote computer storage medium including a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing backflow data, comprising:
   obtaining backflow data from a data warehouse;
   determining, according to a backflow rule for the backflow data, a respective destination table in a production system for each data item in the backflow data; and
   sending the data item according to the determined respective destination table in the production system, wherein sending the data item includes grouping backflow data to the determined destination tables in the production system, wherein data items in the backflow data associated with the same destination table are included in the same group, and sending the backflow data according to the grouping using a plurality of threads, wherein data items in each group are sent to the same destination table in the production system by the same thread;
   wherein sending the data item according to the determined respective destination table in the production system further comprises distributing groups of backflow data to the plurality of threads based at least in part on an amount of data associated with at least one of the groups of backflow data.

2. The method of claim 1, wherein obtaining the backflow data from the data warehouse comprises extracting backflow data from the data warehouse into a memory concurrently by using a plurality of threads.

3. The method of claim 1, wherein the backflow rule is determined according to the number of destination tables in the production system and an attribute of the backflow data.

4. The method of claim 3, wherein the attribute of the backflow data comprises a value of a field in the data item.

5. The method of claim 4, wherein the backflow rule includes applying a hash function to the value of the field in the data item.

6. A backflow processing system, comprising:
   a processor configured to:
      obtain backflow data from a data warehouse;
      determine, according to a backflow rule for the backflow data, a respective destination table in a production system for each data item in the backflow data; and
      send the data item according to the determined respective destination table in the production system, wherein sending the data item includes grouping backflow data to the determined destination tables in the production system, wherein data items in the backflow data associated with the same destination table are included in the same group, and sending the backflow data according to the grouping using a plurality of threads, wherein data items in each group are sent to the same destination table in the production system by the same threat
      wherein sending the data item according to the determined respective destination table in the production system further comprises distributing groups of backflow data to the plurality of threads based at least in part on an amount of data associated with at least one of the groups of backflow data; and
   a memory coupled to the processor, configured to provide the processor with instructions.

7. The system of claim 6, wherein obtaining the backflow data from the data warehouse comprises extracting backflow data from the data warehouse into a memory concurrently by using a plurality of threads.

8. The system of claim 6, wherein the backflow rule is determined according to the number of destination tables in the production system and an attribute of the backflow data.

9. The system of claim 8, wherein the attribute of the backflow data comprises a value of a field in the data item.

10. The system of claim 9, wherein the backflow rule includes applying a hash function to the value of the field in the data item.

* * * * *